(12) United States Patent
Panosian et al.

(10) Patent No.: US 11,092,436 B1
(45) Date of Patent: Aug. 17, 2021

(54) LEVELING INSTRUMENT WITH MULTIPLE SENSITIVITIES

(71) Applicant: TOUGHBUILT INDUSTRIES, INC., Lake Forest, CA (US)

(72) Inventors: Michael H. Panosian, Irvine, CA (US); Joshua Keeler, Lake Forest, CA (US)

(73) Assignee: TOUGHBUILT INDUSTRIES, INC., Lake Forest, CA (US)

( * ) Notice: Subject to any disclaimer, the term of this patent is extended or adjusted under 35 U.S.C. 154(b) by 0 days.

(21) Appl. No.: 17/005,836

(22) Filed: Aug. 28, 2020

(51) Int. Cl.
*G01C 9/28* (2006.01)
*G01C 9/34* (2006.01)
*G01C 9/26* (2006.01)
*G01C 9/06* (2006.01)

(52) U.S. Cl.
CPC .............. *G01C 9/28* (2013.01); *G01C 9/34* (2013.01); *G01C 9/26* (2013.01); *G01C 2009/066* (2013.01)

(58) Field of Classification Search
CPC ....... G01C 9/28; G01C 9/34; G01C 2009/066
See application file for complete search history.

(56) References Cited

U.S. PATENT DOCUMENTS

| 764,556 A | * | 7/1904 | Cable | G01C 9/34 33/381 |
| 786,269 A | * | 4/1905 | Curry | G01C 9/28 33/381 |
| 1,251,349 A | * | 12/1917 | Day | G01C 9/06 33/366.12 |
| 1,286,767 A | * | 12/1918 | Powell | G01C 9/28 33/381 |
| 1,426,454 A | * | 8/1922 | Bredeson | G01C 9/28 33/381 |

(Continued)

FOREIGN PATENT DOCUMENTS

| CN | 210198263 | 3/2020 |
| WO | 2008107868 | 9/2008 |

OTHER PUBLICATIONS

5647/1—Double vial bubble inclinometer (±5° and ±15°); Level Developments, Ltd; Apr. 26, 2010.

(Continued)

*Primary Examiner* — Nimeshkumar D Patel
*Assistant Examiner* — Tania Courson
(74) *Attorney, Agent, or Firm* — Nolte Lackenbach Siegel; Myron Greenspan

(57) ABSTRACT

A leveling instrument includes a generally elongate carrier defining a carrier axis. A first liquid-filled bubble vial is mounted on the carrier and defines a first vial axis and an internal generally barrel-shaped surface of revolution about the first vial axis formed by a curve having a predetermined curvature to exhibit a first sensitivity. A second liquid-filled bubble vial defines a second vial axis and has a generally barrel-shaped surface of revolution about the second vial axis and formed by a curve having a curvature less pronounced than the predetermined curvature of the first vial to exhibit a second sensitivity greater than the first sensitivity, the first and second vial axes being generally parallel to each other. If the vials are curved they are similarly oriented and have different curvatures to exhibit different sensitivities. A method of using the multi-vial leveling instrument is described.

17 Claims, 2 Drawing Sheets

(56) References Cited

U.S. PATENT DOCUMENTS

| | | | | |
|---|---|---|---|---|
| 1,435,365 A * | 11/1922 | Zieman | .................... | G01C 9/28 33/383 |
| 1,646,958 A * | 10/1927 | Facci | .................... | G01B 3/566 33/340 |
| 1,691,776 A * | 11/1928 | Mayes | .................... | G01C 9/26 33/381 |
| 1,752,112 A * | 3/1930 | Severance | ................ | G01C 9/28 33/381 |
| 1,820,365 A * | 8/1931 | Ries | ......................... | G01C 9/34 33/381 |
| 2,084,053 A * | 6/1937 | Wilson | ................... | G01C 9/26 33/350 |
| 2,356,311 A | 8/1944 | Geier | | |
| 2,559,961 A * | 7/1951 | Howell | .................... | F16C 1/04 33/374 |
| 2,729,896 A * | 1/1956 | Rosenblum | ............ | B25D 5/02 33/336 |
| 2,750,678 A * | 6/1956 | Ziemann | ................. | G01C 9/32 33/348 |
| 2,896,453 A * | 7/1959 | Ryan | ....................... | G01F 1/002 73/861.75 |
| 2,948,067 A * | 8/1960 | Mistretta | ................. | G01C 9/34 33/381 |
| D195,431 S * | 6/1963 | Rieker, Jr. et al. | ........... | D10/69 |
| 3,222,794 A * | 12/1965 | MacMillan | ............ | G01B 5/255 33/336 |
| 3,324,564 A * | 6/1967 | Wright | .................... | G01C 9/06 33/366.16 |
| 3,442,024 A * | 5/1969 | Julesm | .................... | G01C 9/28 33/381 |
| 3,491,454 A * | 1/1970 | Wright | .................... | G01C 9/34 33/301 |
| 3,984,919 A * | 10/1976 | Guisti | .................... | G01C 9/28 33/381 |
| 4,347,088 A * | 8/1982 | Jacquet | ................... | G01C 9/26 156/146 |
| 4,419,833 A * | 12/1983 | Wright | .................... | G01C 9/32 33/379 |
| 4,531,301 A * | 7/1985 | Tau | ......................... | G01C 9/28 33/382 |
| 4,574,491 A * | 3/1986 | Vining | ................... | G01C 9/06 33/366.21 |
| 4,635,377 A * | 1/1987 | Park | ....................... | G01C 9/28 33/381 |
| 5,809,659 A * | 9/1998 | Martin | ................... | E04F 21/26 33/418 |
| 6,029,360 A * | 2/2000 | Koch | ....................... | G01C 9/28 33/381 |
| 6,209,211 B1 * | 4/2001 | Szumer | ................... | G01C 9/28 33/382 |
| D468,221 S * | 1/2003 | Greaves | ........................ | D10/69 |
| 6,748,665 B1 | 6/2004 | Samp | | |
| 7,340,841 B2 | 3/2008 | Montogmery | | |
| 7,464,479 B2 * | 12/2008 | Tran | ....................... | G01C 9/26 33/379 |
| D723,954 S * | 3/2015 | Christianson | ................. | D10/69 |
| 9,021,710 B2 | 5/2015 | Silberberg | | |
| 9,151,606 B2 | 10/2015 | Silberberg | | |
| 9,933,259 B1 * | 4/2018 | Vargas | .................... | G01C 9/34 |

OTHER PUBLICATIONS

Bosch DNM 60L Digital Spirit Level, acoustic inclinometer 0-90 degs, 0.6 metres; Bosch.

Vello Two-Axis Hot-Shoe Bubble Level BL-HS2 B&H Photo Video; Johnson.

* cited by examiner

LEVELING INSTRUMENT WITH MULTIPLE SENSITIVITIES

BACKGROUND OF THE INVENTION

1. Field of the Invention

The present invention generally relates to measurement instruments and, more specifically, to leveling instruments with multiple sensitivities.

2. Description of the Prior Art

A spirit level, bubble level or simply a level is an instrument used to indicate whether a surface is horizontal (level) or vertical (plumb). Such levels either include curved glass vials with constant inner diameters at each viewing point or barrel-shaped cavities with a slightly larger diameter in the middle that are incompletely filled with a liquid, leaving a bubble in the tube. As the tube or vial is displaced the bubble shifts and seeks to rise to the highest point within the inner cavity.

The sensitivity is important specification for a level as its accuracy depends on its sensitivity. The sensitivity specification is determined by the sensitivity of the vials that are used. Sensitivity is determined by the radius of curvature of the vials or the inner barrel shaped cavities along which the bubble moves across. Sensitivity is defined as the angle of tilt in degrees, minutes or seconds required to move the bubble a distance "X" (one graduation). In the level industry, "X" is usually designated as a distance of 0.1 inch or 2 mm per graduation. However, "X" can also be other distances, e.g. 0.05 inch, 0.06 inch, 3 mm, etc. Sensitivity is directly related to the radius of curvature of the vial. The longer or greater the radius, the more sensitive the vial will be. The shorter or smaller the radius, the coarser the vial will be. Users of levels normally decide the sensitivity of the level that is needed for a particular project. In order to determine which sensitivity is best for a particular application, it is first necessary to decide how level a measured surface needs to be. If precision is not a big factor than a lower sensitivity level can be used. However, if greater precision is required a higher sensitivity vial needs to be used. Since higher sensitivity vials are much more responsive to angular displacements relying only on a high sensitivity vial can be frustrating to the user because even small angular displacements causes the bubble to rapidly shift from one extreme end of the vial to the other.

Traditionally, levels normally include two vials, one with its axis generally parallel to the longitudinal direction or axis of the level body or carrier and one with its axis generally normal to the longitudinal direction or axis of the level. One is used to measure level and the other to measure plumb. However, both vials are similar and have substantially the same sensitivities or the same arcuate curvatures along which the bubbles travel. See, for example, U.S. Pat. Nos. 7,340,841 and 6,748,665. For projects that require different sensitivities workers may require the use of two or more levels having different sensitivities.

SUMMARY OF THE INVENTION

Accordingly, it is an object of the invention to provide a level that overcomes the inherent disadvantages in most existing levels.

It is another object of the invention to provide a level that is easy and convenient to use.

It is still another object of the invention to provide a level that enables the user to initially use a lower sensitivity bubble vial for coarser adjustments and a higher sensitivity bubble vial form more precise adjustments.

It is yet another object of the invention to provide a level that can measure level or plumb at multiple sensitivities.

It is a further object of the invention to provide a level as in the previous objects that is simple in construction and economical to manufacture.

It is still further object of the invention to provide a level of the type under discussion that facilitates measurements and alleviates frustrations in making measurements, particularly more accurate or precision measurements.

It is yet a further object of the invention to provide a level of the type under discussion that can utilize straight, curved or any other vials ranging from low, moderate or high sensitivities.

In order to achieve the above objects, as well as others that will become evident hereinafter, a leveling instrument in accordance with the invention comprises a generally elongate carrier defining a carrier axis. A first liquid-filled bubble vial is mounted on said carrier and defines a first vial axis and an internal generally barrel-shaped surface of revolution about said first vial axis formed by a curve having a predetermined curvature. A second liquid-filled bubble vial defines a second vial axis and has a generally barrel-shaped surface of revolution about said second vial axis and formed by a curve having a curvature less pronounced than said predetermined curvature. Said first and second vial axes are generally parallel to each other.

A method of making measurements with a level in accordance with the invention comprises the steps of arranging and elongate carrier defining a carrier axis on a surface to be measured. First and second liquid-filled bubble vials are provided on said carrier defining first and second vial axes, respectively. Said first and second vial axes are parallel to each other and said first vial has a predetermined sensitivity while said second vial has a sensitivity greater than said predetermined sensitivity. The bubble in said first vial is observed while the surface to be leveled is moved until the bubble in said first vial is substantially centered along said first vial axis. When the bubble in said first vial is substantially centered, then observing the bubble in said second liquid-filled bubble vial and moving the surface to be leveled until the bubble in said second liquid-filled bubble vial is substantially centered. Said first liquid-filled bubble vial provides a coarser measurement and said second liquid-filled bubble vial provides a finer or more accurate measurement to improve the precision of measurement.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
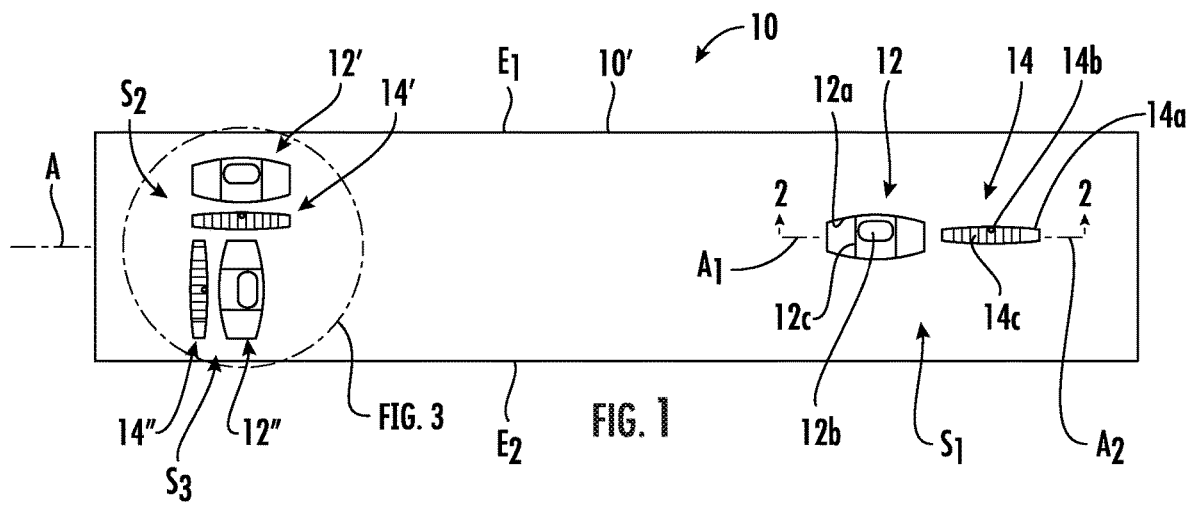
FIG. 1 is a front elevation diagrammatic view of a leveling instrument in accordance with the invention.

Referring now specifically to the Figures, in which identical or similar parts are designated by the same reference numerals throughout, and first referring to FIG. 1, a leveling instrument 10 is illustrated diagrammatically and includes a generally elongate carrier 10' defining a carrier axis A and two parallel edges or surfaces E 1 and E 2 that are butted against surfaces that are to be leveled or plumbed.

The invention involves the use of two or more sets of associated bubble vials of different measurement sensitivities. In one preferred embodiment each set of associated vials includes two vials although, as will become clear, more than two associated violence can be used. In the illustrated embodiment shown in FIG. 1 a first liquid-filled bubble vial 12 is mounted on the carrier 10' and has a first vial axis $A_1$ and an internal generally barrel-shaped surface of revolution 12a about said first vial axis A1 formed by a curve having a predetermined curvature to provide a first vial sensitivity. A second liquid-filled bubble vial defines a second vial axis $A_2$ and having a generally barrel-shaped surface of revolution 14a about said second vial axis $A_2$ formed by a curve having a curvature less pronounced than said predetermined curvature. The first and second vials 12, 14 are partially filled with a fluid or liquid resulting in bubbles 12b and 14, respectively, that seek the highest points along the curved surfaces during leveling measurements, as is well known in the art.

In FIG. 1 one set S of associated Vials 12, 14 are arranged so that the first and second vial axes $A_1$ and $A_2$ are generally aligned or coextensive in-line and these axes are generally parallel to the carrier axis A. Also shown on the left as viewed in FIG. 1 or two additional sets of vials S 2 and S 3. As with the set $S_1$ all the vials in a given set are arranged so that their axes are parallel to each other.

The vials forming the set $S_2$ also have their axes generally parallel to the carrier axis A but the first and second vial axes are offset from each other along a direction normal to the carrier axis A. The set of vials $S_3$ is similar to the set $S_2$ except that they are angularly displaced by 90° so that the axes of these vials are normal or perpendicular to the carrier axis A.

In accordance with normal practice, either one of the sets $S_1$ or $S_2$ can be used to level a surface by placing one of the edges of surfaces $E_1$ or $E_2$ on the surface to be leveled. The set $S_3$ is used when a vertical surface is to be plumbed by placing the edges or surfaces $E_1$ or $E_2$ against a generally vertical surface.

Figure 2:
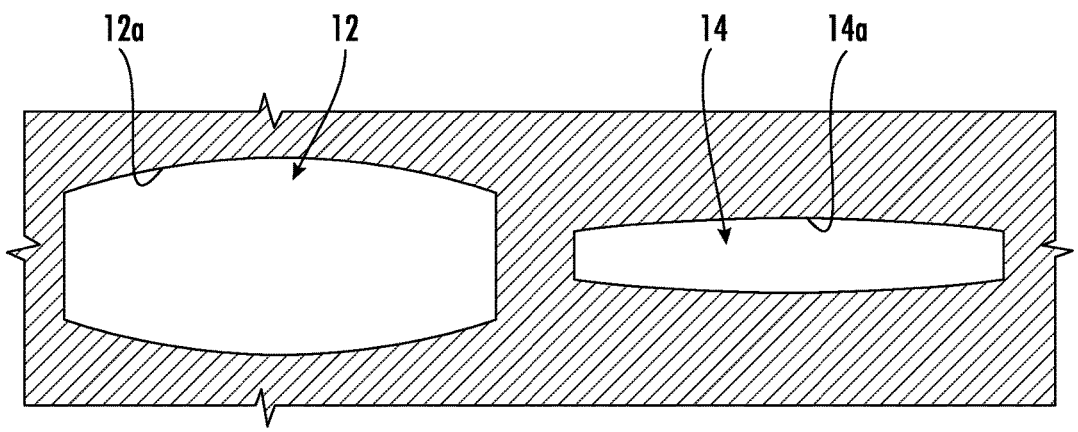
FIG. 2 is an enlarged fish section of two different sensitivity vials shown in FIG. 1, taken along line 2-2.

An important feature of the invention, in addition to using at least one set of at least two associated bubble vials, is that each of the vials in any given set have different sensitivities and they are generally parallel or similarly oriented relative to each other. Vial sensitivity, as indicated, involves using different levels or degrees of curvature in each of the vials. Referring to FIG. 2, for example, the vial 12 has a surface of revolution 12a having a predetermined radius of curvature formed by a circular arc having a radius $R_1$ while the surface of revolution 14a of the second vial 14 is formed by a circular arc having a radius $R_2$, wherein $R_1$ is less than $R_2$. The ratio of $R_1$ to $R_2$ will determine the range of sensitivities of the two vials and, therefore, the range of precision of measurement. While it is contemplated that this ratio is greater than 2 a ratio between 5 and 10 provides satisfactory results.

Figure 3:
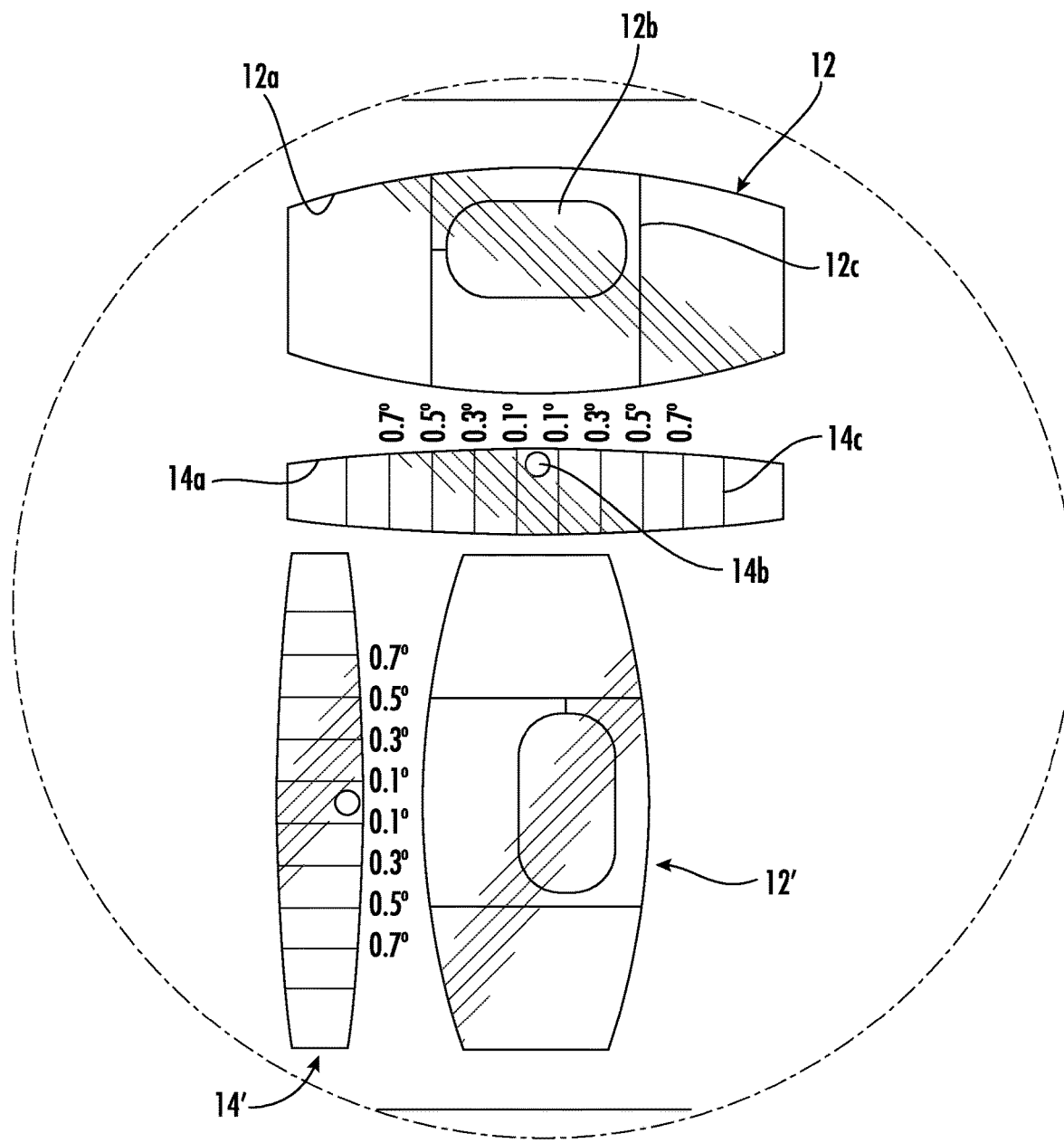
FIG. 3 is an enlarged view of region "FIG. 3" in FIG. 1.

The specific locations of each set of vials $S_1$-$S_3$ on the carrier 10' are not critical and each of these or other sets of vials can be positioned at the longitudinal ends of the carrier 10', at the center or anywhere else along the carrier. Referring to FIGS. 1 and 3 the vials 12' and 14' are used to measure level as with the vials 12, 14 while the vial 12" and 14" are used to measure plumb.

While the curved surfaces 12a, 14a are shown as being formed within the body of the carrier 10' this is only for simplicity or illustrative purposes. These surfaces are typically provided within a standalone vial or vials that are formed within a vial module that is mounted on the carrier 10'.

It will be understood that while most commercial curved vials and vial modules exhibit barrel-shaped curvatures formed as surfaces of revolution by circular arcs, the subject invention is not limited to the specific curved nature or configuration of the curves that form the surfaces of revolution. Such curvatures can be hyperbolic, parabolic or any other curvatures that can be used to create vials having different sensitivities.

Referring to FIG. 3, at least one of the vials is provided with markings 12c, 14c. Such markings are conventional, the markings or markers 12c can be used to locate the bubble generally in the center to signify substantial level orientation. While this may be sufficiently accurate for some applications a more accurate level reading can be obtained by orienting the surface to be leveled more carefully to bring the bubble of the more sensitive vial to the center as shown.

In its broadest aspects, therefore, the invention is for a leveling instrument that has a first liquid-filled bubble vial defining a first vial axis and a first vial sensitivity in a second liquid-filled bubble vial defining a second vial axis and a second vial sensitivity with said first and second vial axes being generally parallel to each other. In the case of curved vials with different sensitivities these must generally be similarly oriented to provide the same measurement at different sensitivities.

The method of making measurements with a level in accordance with the invention involves arranging an elongate carrier defining a carrier axis on a surface to be measured. First and second liquid-filled bubble vials on the carrier defined first and second vial axes or orientations, respectively. The first and second vial axes are parallel to each other or curved vials are similarly oriented relative to each other, with one vial having a greater sensitivity than the second vial. In using the level, the vial of lower sensitivity is observed while moving the surface to be leveled until the bubble in the first vial is substantially scented. When the liquid filled bubble in the first vial substantially centered the bubble in the second liquid filled bubble vial is observed while moving the surface until the bubble in the second liquid filled bubble vial is substantially scented as well. In this matter, the first liquid filled bubble vial provides a coarser measurement in the second liquid filled bubble vial provides a finer measurement to improve precision of measurement.

While the invention has been described with two vials of different sensitivities in each set of vials, it will be appreciated that the invention also contemplates sets of vials having more than two vials in each set. Thus, for example, a set of vials can include three vials each having different sensitivities and arranged so that the axes of all three vials are parallel to each other, either parallel to the axis of the carrier or normal air to.

The use of two vials in each set of vials, as described above, can be used to make more rapid precision measurements or provide the equivalent of two or more levels utilizing single vials as in the prior art, obviating the necessity to purchase and potentially transport and store multiple levels, resulting in greater convenience and reduced costs.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A leveling instrument comprising a generally elongate carrier defining a carrier axis; a first liquid-filled bubble vial mounted on said carrier and defining a first vial axis and an internal barrel-shaped surface of revolution about A said first vial axis formed by an arcuate curve having a predetermined curvature; a second liquid-filled bubble vial defining a second vial axis and having an internal barrel-shaped surface of revolution about said second vial axis and formed by an arcuate curve having a curvature less pronounced than said predetermined curvature, and both said first and second vial axes being one of parallel or normal to said carrier axis.

2. A leveling instrument as defined in claim 1, wherein said first and second vial axes are generally aligned or co-extensive in line.

3. A leveling instrument as defined in claim 1, wherein said first and second vial axes are offset from each other along a direction normal to said carrier axis.

4. A leveling instrument as defined in claim 1, wherein said first and second vial axes are generally normal to said carrier axis.

5. A leveling instrument as defined in claim 1, wherein said predetermined curvature is formed by a circular arc having a radius R1 and said surface of revolution of said second vial is formed by a circular arc having a radius R2, wherein R1<R2.

6. A leveling instrument as defined in claim 5, wherein R2/R1>2.

7. A leveling instrument as defined in claim 6, wherein R2/R1>5.

8. A leveling instrument as defined in claim 1, wherein said first and second vials are arranged on said elongate carrier in a region at one axial end of said carrier.

9. A leveling instrument as defined in claim 1, wherein said carrier includes first and second liquid-filled bubble vials with first and second vial axes are generally parallel to said carrier axis and another set of first and second vials with first and second vial axes generally perpendicular or normal to said carrier axis.

10. A leveling instrument as defined in claim 1, wherein said curvatures are non-circular.

11. A leveling instrument as defined in claim 10, wherein said first vial is provided with markings to designate when a liquid-filled bubble and said first vial is substantially centered along said first vial axis, and said second vial is provided with markings to designate when a liquid-filled bubble and said second vial substantially centered along said second vial axis.

12. A leveling instrument as defined in claim 1, wherein at least one of said vials is provided with markings.

13. A leveling instrument as defined in claim 1, wherein said first and second liquid-filled bubble vials are incorporated in separate blocks or members that are mounted on said elongate carrier.

14. A leveling instrument as defined in claim 13, wherein said second vial sensitivity is greater than said first vial sensitivity.

15. A leveling instrument comprising an elongate carrier defining a carrier axis; a first liquid-filled bubble vial defining a first vial axis and a first vial sensitivity; a second liquid-filled bubble vial defining a second vial axis and a second vial sensitivity, said first and second vial axes being parallel to each other and one of parallel or normal to said carrier axis, said first and second vials being formed with internal barrel-shaped surface of revolution about said first and second vial axes formed by an arcuate curve having different degrees of curvature.

16. A method of making measurements with a level comprising the steps of arranging an elongate carrier defining a carrier axis on a surface to be measured; providing first and second liquid-filled bubble vials on said carrier defining first and second vial axes, respectively, said first and second vial axes being one of parallel or normal to said carrier axis and said first vial having a predetermined sensitivity while said second vial has a sensitivity greater than said predetermined sensitivity, said first and second vials being formed with internal barrel-shaped surfaces of revolution about said respective first and second vial axes formed by arcuate curves having different degrees of curvature; observing the surface while moving the liquid-filled bubble and said first vial until said liquid-filled bubble and said first vial is substantially centered along said first vial axis; when said liquid-filled bubble and said first vials substantially centered observing the bubble in said second liquid-filled bubble vial and moving the surface until the bubble in said second liquid-filled bubble vial is substantially centered, whereby said first liquid-filled bubble vial provides a coarser measurement and said second liquid-filled bubble vial provides a finer measurement to improve precision of measurement.

17. A method as defined in claim 16, further providing at least two sets or pairs of vials on said elongate carrier, at least one set of first and second liquid-filled bubble vials being arranged with axes generally parallel to said carrier axis in at least one set of first and second liquid-filled bubble vials being arranged with axes generally normal to said carrier axis.

* * * * *